Patented Dec. 28, 1926.

1,612,676

UNITED STATES PATENT OFFICE.

FERNANDO SOMOZA VIVAS, OF LOS ANGELES, CALIFORNIA, ASSIGNOR TO N. W. STOWELL AND J. H. DOCKWEILER, TRUSTEES.

WATER AND FIRE PROOFING COMPOSITION FOR WOOD.

No Drawing. Application filed June 14, 1923, Serial No. 645,348. Renewed May 26, 1926.

The invention relates to a composition to be used for the impregnating of wood to make the same both water-proof and fireproof. An object of the invention is the provision of a water and fireproofing composition for use in the impregnation of wood which shall be inexpensive to use, while being effective for the purpose for which it is designed.

The formula which it is at present preferred to use as a physical embodiment of the invention with the preferred proportions of parts is as follows:

| | Parts. |
|---|---|
| Sodium tungstate | 6 |
| Potash alum | 40 |
| Borax | 40 |
| Boric acid | 20 |
| Sodium bichromate | 6 |
| Isinglass | 12 |
| Tannic acid | 2 |
| Sodium bisulfate | 16 |
| Water | 850 |

The isinglass is given as a preferable form of an organic adhesive which is affected by the fixing ingredients, as tannic acid, and to some extent sodium bichromate and sodium bifulsate, to harden the same and thereby make it insoluble and therefore waterproof. It will be understood that substances adapted to make the organic adhesive insoluble when dry other than tannic acid may be utilized, although this substance is an inexpensive and effective agent for the purpose.

In the treatment of the wood with the formula a single bath embodying the named ingredients is made up, the wood is placed in a cylinder or tank, as is the usual practice in the treatment of wood, which is then closed, and the substance is pumped into the tank and allowed to remain substantially twenty-four hours for each inch of penetration. It is found by experiment that the formula as given acts to dissolve the sap present in the wood and to fill the pores thereof with a water insoluble non-inflammable material.

Minor changes may be made in the proportions named and known equivalents may be substituted for some of the ingredients without departing from the spirit of the invention.

I claim:

1. Water and fireproofing material for wood comprising in combination, an organic adhesive, a substance adapted to make the organic adhesive insoluble when dry, alum, borax, a bichromate, sodium bisulfate and water in proportions to make the wood water and fireproof when the wood is impregnated therewith.

2. Water and fireproofing material for wood comprising in combination, an organic adhesive, tungstate of sodium, an alum, borax, boric acid, sodium bichromate, a substance adapted to make the organic adhesive insoluble when dry, sodium bisulfate and water in proportions to make the wood water and fireproof when the wood is impregnated therewith.

3. Water and fireproofing material for wood comprising in combination, tungstate of sodium, potash alum, borax, boric acid, sodium bichromate, isinglass, a substance adapted to make the organic adhesive insoluble when dry, sodium bisulfate and water in proportions to make the wood water and fireproof when the wood is impregnated therewith.

4. Water and fireproofing material for wood comprising in combination, tungstate of sodium, 6 parts, potash alum, 40 parts, borax, 40 parts, boric acid, 20 parts, sodium bichromate, 6 parts, isinglass, 12 parts, tannic acid 2 parts, sodium bisulfate, 16 parts, and water 850 parts.

FERNANDO SOMOZA VIVAS.